US011220765B2

(12) United States Patent
Jayasuriya et al.

(10) Patent No.: US 11,220,765 B2
(45) Date of Patent: Jan. 11, 2022

(54) SEATBELT WEBBING INCLUDING AUXETIC PORTION

(71) Applicant: Ford Global Technologies, LLC, Dearborn, MI (US)

(72) Inventors: Mangala A. Jayasuriya, Bloomfield Hills, MI (US); Robert William McCoy, Ann Arbor, MI (US); Mark Allan Lippman, New Baltimore, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 88 days.

(21) Appl. No.: 16/592,805

(22) Filed: Oct. 4, 2019

(65) Prior Publication Data

US 2021/0102316 A1    Apr. 8, 2021

(51) Int. Cl.
*D03D 1/00*     (2006.01)
*B60R 22/12*    (2006.01)
*B60R 22/28*    (2006.01)

(52) U.S. Cl.
CPC ........... *D03D 1/0005* (2013.01); *B60R 22/12* (2013.01); *B60R 2022/286* (2013.01)

(58) Field of Classification Search
CPC .. B60R 2022/286; B60R 22/12; D03D 1/0005
See application file for complete search history.

(56) References Cited

U.S. PATENT DOCUMENTS

| 7,160,621 | B2 | 1/2007 | Chaudhari et al. |
| 10,064,452 | B1 | 9/2018 | Faruque et al. |
| 2017/0258180 | A1* | 9/2017 | Cross ............... A43B 13/02 |
| 2017/0362414 | A1* | 12/2017 | Pasini ............... C08L 7/02 |

FOREIGN PATENT DOCUMENTS

| CN | 102729948 A | 10/2012 |
| DE | 102017003109 A1 | 10/2018 |

* cited by examiner

*Primary Examiner* — Paul N Dickson
*Assistant Examiner* — Maxwell L Meshaka
(74) *Attorney, Agent, or Firm* — Frank A. MacKenzie; Bejin Bieneman PLC

(57) ABSTRACT

A seatbelt webbing includes an auxetic portion elongated along an axis. The auxetic portion includes a plurality of segments rotatably connected to each other at hinges. The hinges are spaced along the axis and are transverse to the axis. The auxetic portion includes a plurality of strands. Each strand is embedded in at least two of the hinges. When tensile force above a predetermined level is applied to the auxetic portion by a vehicle occupant, e.g., the chest of the vehicle occupant, the auxetic portion both stretches along the axis and widens transverse to the axis, i.e., has a negative Poisson ratio.

15 Claims, 8 Drawing Sheets

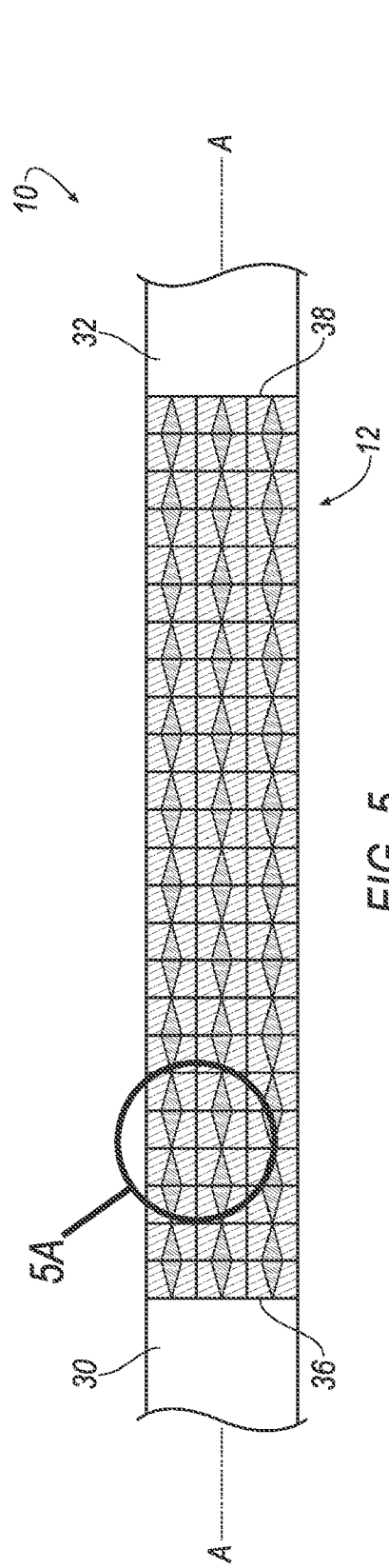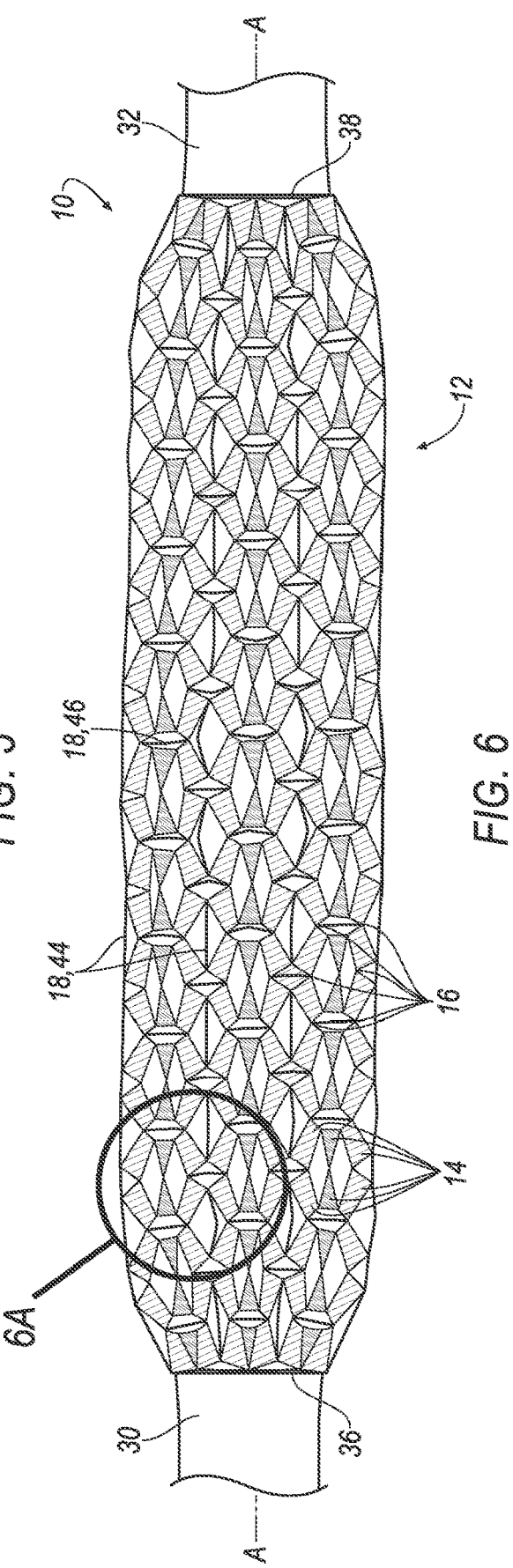
FIG. 5
FIG. 6

SEATBELT WEBBING INCLUDING AUXETIC PORTION

BACKGROUND

The seatbelt portion of a vehicle restraint system secures an occupant of a vehicle against harmful movement that may result from a vehicle collision. The seatbelt functions to reduce the likelihood of injury by reducing the force of occupant impacts with vehicle interior structures. In this role, the seatbelt applies loads across the chest or lap of the occupant. Controlling or reducing these loads may reduce the risk of occupant injury during a collision.

BRIEF DESCRIPTION OF THE DRAWINGS

FIG. 5 is a front view of the seatbelt webbing with another example of the auxetic portion in an initial position.

FIG. 6 is the view of FIG. 5 with the auxetic portion in a stretched position.

DETAILED DESCRIPTION

Figure 1:
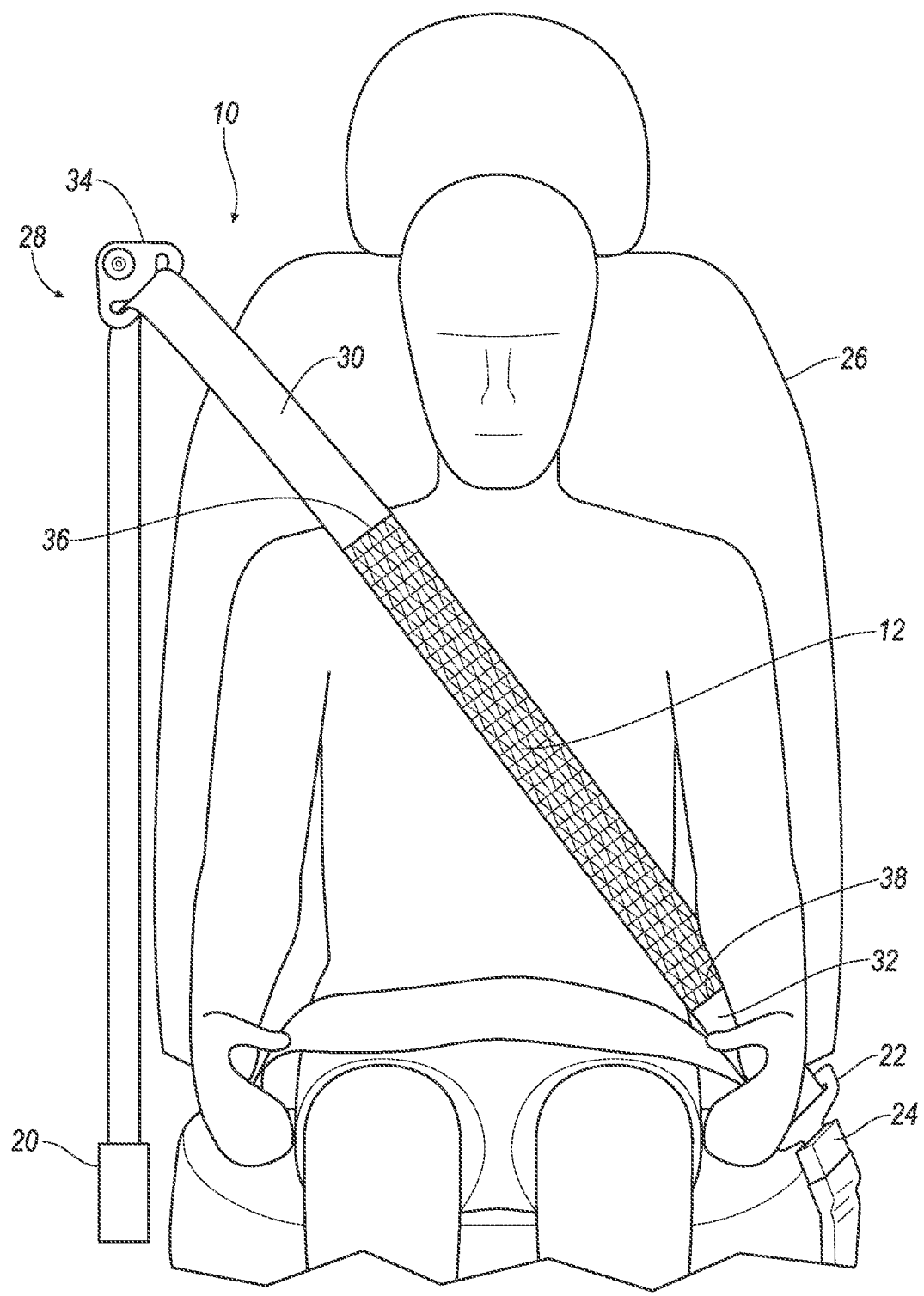
FIG. 1 is a front view of a vehicle seat including a seatbelt webbing extending across an occupant, the seatbelt webbing including an auxetic portion across the chest of the occupant.

A seatbelt webbing includes an auxetic portion elongated along an axis and having a plurality of segments rotatably connected to each other at hinges. The hinges are spaced along the axis and transverse to the axis. The seatbelt webbing includes a plurality of strands, each strand embedded in at least two of the hinges.

The auxetic portion may terminates at a first end on the axis and at a second end on the axis. At least some of the strands may extend from the first end to the second end.

The auxetic portion may terminate at a first end on the axis and at a second end on the axis, and at least some of the strands may extend from the first end to the second end in a zigzag configuration.

The auxetic portion may be movable from an initial position to a stretched position. The segments have sides, the sides abutting adjacent ones of the segments in the initial position. The sides being spaced from the sides of adjacent ones of the segments in the stretched position. The strands may be in a zigzag orientation in the initial position and a substantially straight position along the axis in the stretched position.

A woven portion may be fixed to the auxetic portion and extending from the auxetic portion along the axis. A second woven portion may be fixed to the auxetic portion, the auxetic portion extending along the axis from the woven portion to the second woven portion.

The hinges rotate may transverse to axis.

The auxetic portion may be movable from an initial position to a stretched position. The segments are elongated along the axis and have longitudinal sides extending along the axis. The longitudinal sides abut the longitudinal sides of adjacent ones of the segments in the initial position, and the longitudinal sides are spaced from the longitudinal sides of adjacent ones of the segments in a direction transverse to the axis in the stretched position.

The segments may have lateral sides between the longitudinal sides, the lateral sides abutting the lateral sides of adjacent ones of the segments in the initial position, and the lateral sides being spaced from the lateral sides of adjacent ones of the segments along the axis in the stretched position.

The segments may be in a repeating pattern. The repeating pattern may include a repeated grouping of six segments. Two of the six segments may have a first shape and four of the six segments have a second shape. The segments may be polymeric. The polymer is a fiber-reinforced polymer.

A method includes providing a mold having a cavity elongated along an axis, the cavity having a plurality of segment cavities spaced from each other along the axis and transverse to the axis by mold walls, and channels through the mold walls connecting the segment cavities. The method includes laying longitudinal strands in a zigzag configuration along the axis across the cavities and through the channels. The method includes, after laying the longitudinal strands, injecting polymer into the cavities and channels.

The method may include laying lateral strands along an axis transverse to the axis.

The method may include laying the lateral strands includes positioning the lateral strands to be substantially straight.

The method may include laying the lateral strands includes positioning the lateral strands to extend from one channel to another channel.

The method may include laying the lateral strands includes positioning the lateral strands on mold walls free of communication with the segment cavities.

With reference to the Figures, wherein like numerals indicate like parts throughout the several views, a seatbelt webbing 10 for a vehicle includes an auxetic portion 12 elongated along an axis A. The auxetic portion 12 has a plurality of segments 14 rotatably connected to each other at hinges 16. The hinges 16 are spaced along the axis A and transverse to the axis A. The seatbelt webbing 10 has a plurality of strands 18. Each strand 18 is embedded in at least two of the hinges 16.

When tensile force above a predetermined level is applied to the auxetic portion 12 by a vehicle occupant, e.g., the chest of the vehicle occupant, the auxetic portion 12 both stretches along the axis A and widens transverse to the axis A, i.e., has a negative Poisson ratio. The stretching along the axis A relieves the force of the auxetic portion 12 against the occupant and the widening of the auxetic portion 12 distributes the force of the auxetic portion 12 against the occupant across a larger area. This reduces the force from the seatbelt webbing 10 on the occupant. As an example when the auxetic portion 12 is across the chest of the occupant, e.g., in FIGS. 1-2, the stretching and widening of the auxetic portion 12 reduces chest compression. The stretching along the axis A may also reduce head acceleration of the occupant.

As described below, the auxetic portion 12 may include any suitable arrangement, shape, and pattern of segments 14, hinges 16, and strands 18 that result in the auxetic portion 12 stretching and widening when subjected to tensile force above the predetermined level. One example of the auxetic portion 12 is shown in FIGS. 3, 3A, 4, and 4A and another example is shown in FIGS. 1-2, 5, 5A, 6, and 6A. Common numerals are used to identify common features (including common features having different shapes) amongst these two examples.

The vehicle may be any suitable type of automobile, e.g., a passenger or commercial automobile such as a sedan, a coupe, a truck, a sport utility vehicle, a crossover vehicle, a van, a minivan, a taxi, a bus, etc.

A seatbelt assembly 28 may include a seatbelt retractor 20, an anchor (not numbered), a clip 22, and a buckle 24. The webbing 10 is connected to the seatbelt retractor 20 and the anchor, as are known in the art. The seatbelt retractor 20 and the anchor both anchor the webbing 10 to the rest of the vehicle, i.e., a seat 26 and/or vehicle body, etc. The webbing 10 is retractably payable from the seatbelt retractor 20. A clip 22 is engaged with the webbing 10, e.g., is slidable along the webbing 10 and is retained on the webbing 10. A buckle 24 is fixed to another component of the vehicle, e.g., the seat 26, vehicle body, etc., and the clip 22 is releasably engageable with the buckle 24 to strap and unstrap the occupant to the seat 26. The seatbelt assembly 28, when fastened, retains the occupant on the seat, e.g., during sudden decelerations of the vehicle.

The webbing 10 may extend continuously from the seatbelt retractor 20 to the anchor. For example, one end of the webbing 10 feeds into the seatbelt retractor 20, and the other end of the webbing 10 is fixed to the anchor. Specifically, the webbing 10 may have a first woven portion 30 and a second woven portion 32. The auxetic portion 12 is between the first woven portion 30 and the second woven portion 32 along the axis A. In other words, the auxetic portion 12 extends from the first woven portion 30 to the second woven portion 32 along the axis A. The axis A is the longitudinal centerline of the webbing 10 and, thus, can turn as the webbing 10 curves, e.g., along the retractor 20, along an occupant, etc.

The anchor may, for example, be fixed to the seat 26. As another example, the anchor may be fixed to the vehicle body, e.g., the B-pillar, the floor, etc. The anchor may be attached to the seat 26, vehicle body, etc., in any suitable manner, e.g., with fasteners.

The seatbelt retractor 20 may be mounted to the vehicle body. For example, the seatbelt retractor 20 may be attached to the B-pillar, as shown in FIG. 1. As another example, when the seatbelt assembly 28 is on a rear seat, the seatbelt retractor 20 may be attached to the C-pillar. Alternatively, the seatbelt retractor 20 may be attached to the seat 26. The seatbelt retractor 20 may be attached to the vehicle body in any suitable manner, e.g., fasteners.

The seatbelt retractor 20 may be moveable from an unlocked position to a locked position, as is known in the art. In the unlocked position, the webbing 10 may be extended from and retracted into the seatbelt retractor 20. In the locked position, the seatbelt retractor 20 prevents extension of the webbing 10 to limit the forward movement of the occupant. The seatbelt retractor 20 may be in the unlocked position by default, i.e., in the absence of a sudden deceleration. The seatbelt retractor 20 may change from the unlocked position to the locked position during a sudden deceleration of the vehicle, i.e., deceleration triggers components of the seatbelt retractor 20 to change from the unlocked position to the locked position. The seatbelt retractor 20 may include load-limiting features, e.g., a torsion bar as is known in the art. For example, when the seatbelt retractor 20 is in the locked position but the webbing 10 exerts a force (not shown) on the seatbelt retractor 20, the torsion bar may prevent the webbing 10 from paying out unless the force by the webbing 10 exceeds a threshold, in which case the rotational yielding may permit the webbing 10 to pay out of the retractor 20. Such load-limiting features may be designed, e.g., triggering forces, amount of payout, etc., in conjunction with the stretching and widening of the auxetic portion 12.

The seatbelt assembly 28 may include a D-ring 34 engaged with the webbing 10. For example, the webbing 10 may freely slide through the D-ring 34. In other words, the webbing 10 may extend from the anchor through the D-ring 34 to the seatbelt retractor 20. The D-ring 34 may be spaced from the seatbelt retractor 20. The D-ring 34 may be fixed to the vehicle body, e.g., the B-pillar.

The clip 22 slides freely along at least a portion of the webbing 10 and, when engaged with the buckle 24, divides the webbing 10 into a lap band and a shoulder band. The seatbelt assembly 28 may be a three-point harness, meaning that the webbing 10 is attached at three points around the occupant when fastened: the anchor, the seatbelt retractor 20, and the buckle 24. The seatbelt assembly 28 may, alternatively, include another arrangement of attachment points. The auxetic portion 12 may be on the shoulder band. For example, the auxetic portion 12 may be spaced from and between the clip 22 and the D-ring 34 when the clip 22 is attached to the buckle 24.

During, e.g., a frontal and/or rear impact, the seatbelt assembly 28 restrains the occupant at the seat and/or limits a displacement of the occupant relative to the seat 26 in response to a vehicle deceleration caused by the vehicle impact. As a result of inertial force, restraining the occupant during a vehicle impact, the seatbelt may apply force to the torso of the occupant. For example, the seatbelt assembly 28 may apply chest compression and or abdominal compression during the vehicle impact.

As set forth above, the auxetic portion 12 stretches and widens when a tensile force above the predetermined level is applied to the auxetic portion 12. The tensile force is along the axis. Specifically, the tensile force is caused by the occupant pressing against the webbing 10 while movement of the ends of the webbing 10 is restricted, i.e., when the retractor 20 is locked. The tensile force on the auxetic portion 12 is applied, in part, due to the auxetic portion 12 being anchored to the first woven portion 30 and the second woven portion 32. The predetermined level may be a design feature determined by empirical testing, computer modeling, etc.

Figure 2:
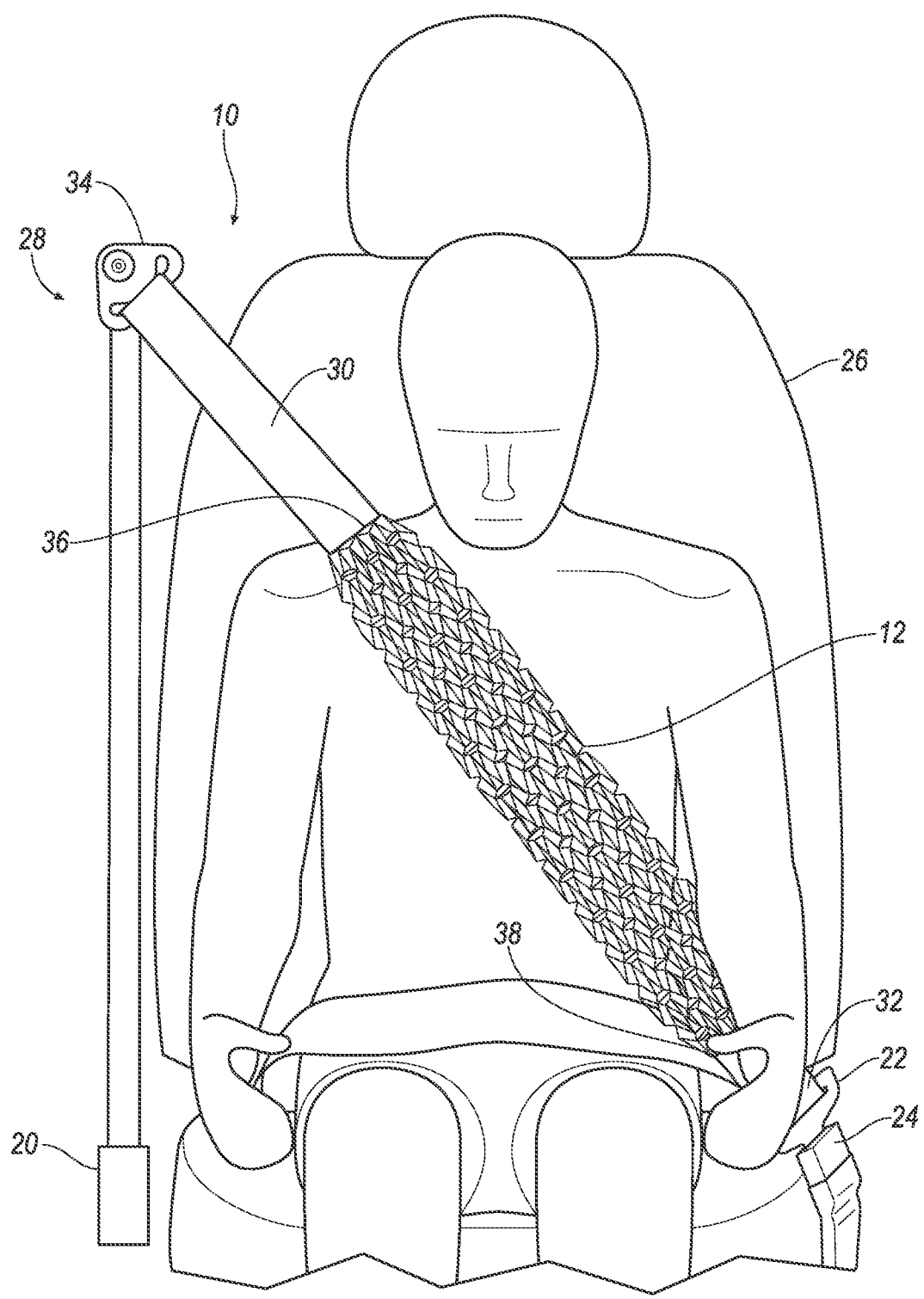
FIG. 2 is the front view of FIG. 1 during a vehicle impact that urges the occupant forward and away from the vehicle seat with the auxetic portion stretching and widening.

The first woven portion 30 and the second woven portion 32 of the webbing 10 may be fabric, e.g., woven nylon. The first woven portion 30, the second woven portion 32, and the auxetic portion 12 are sufficiently flexible to conform to the shape of the retractor 20, the clip 22, the occupant, the D-ring 34, etc. The auxetic portion 12 may be approximately 2 mm thick, i.e., perpendicular to the axis into the page in FIGS. 3A and 4A. The auxetic portion 12 is movable from an initial position, shown in FIGS. 1, 3, and 5, to the stretched position, as shown in FIGS. 2, 4, and 6. The auxetic portion 12 may have the same width W as the first woven portion 30 and the second woven portion 32 in the initial position and is wider in the width W direction than the first woven portion and the second woven portion 32 in the stretched position. The auxetic portion 12 does not change in thickness (i.e., the direction into the page in FIGS. 3, 4, 5, and 6) from the initial position to the stretched position. The first woven portion 30, the second woven portion 32, and the auxetic portion 12 may have the same thickness as each other in both the initial position and the stretched position.

The first woven portion 30 and the second woven portion 32 are fixed to the auxetic portion 12. The first woven portion 30 and the second woven portion 32 may be fixed to the segments 14, the strands 18, and/or the hinges 16 of the auxetic portion 12. The auxetic portion 12 terminates at a first end 36 and at a second end 38 spaced along the axis from the first end 36. The first woven portion 30 is fixed to the first end 36 and the second woven portion 32 is fixed to the second end 38. As an example, the first woven portion 30 and the second woven portion 32 may be stitched to the auxetic portion 12, e.g., stitched to the segments 14, the strands 18, and/or the hinges 16. As other examples in addition to or in the alternative to stitching, the first woven portion 30 and the second woven portion 32 may be adhered, ultrasonically welded, etc., to the first woven portion 30 and the second woven portion 32.

The segments 14 are connected to each other at hinges 16, as described further below. At least some of the segments 14 rotate relative to each other about the hinges 16 as the auxetic portion 12 moves from the initial position to the stretched position. This rotation widens the auxetic portion 12 (i.e., increases the width W). At least some of the segments 14 translate relative to each other along the axis to stretch the auxetic portion 12 along the axis.

The segments 14 are polymeric. As an example, the segments 14 may be plastic. Specifically, the plastic may be fiber-reinforced plastic, i.e., including short fibers, chopped fibers, etc., encased by the plastic. The segments 14 may be nylon, polyester, fiber-reinforced thermoplastic (e.g., carbon fiber reinforced thermoplastic). The segments 14 are rigid relative to the strands 18. As the segments 14 rotate about the hinges 16, the segments 14 move the strands 18.

The segments 14 may be arranged in a single layer along the axis A. The auxetic portion 12 may include one such layer of segments 14, or as another example, may include more than one layer stacked to increase a thickness of the auxetic portion 12, i.e., into the page in FIGS. 3, 4, 5, and 6. The segments 14 have sides 40, 42 abutting the sides 40, 42 of adjacent segments 14 in the initial position. The sides 40, 42 are spaced from the sides 40, 42 of adjacent segments 14 in the stretched position.

Specifically, at least some of the segments 14 are elongated along the axis A and have longitudinal sides 40 extending along the axis A and lateral sides 42 between the longitudinal sides 40. In examples such as those shown in the figures, some of the segments 14 are four-sided and have lateral sides 42 extending from one longitudinal side 40 to the other longitudinal side 40. The longitudinal sides 40 abut the longitudinal sides 40 of adjacent ones of the segments 14 in the initial position, and the longitudinal sides 40 are spaced from the longitudinal sides 40 of adjacent ones of the segments 14 in a direction transverse to the axis, i.e., in the direction of width W, in the stretched position. As shown in FIGS. 4 and 6, as the segments 14 rotate about the hinges 16, the longitudinal sides 40 rotate away from each other and move away from the axis A in the direction of width W. This results in the widening of width W of the auxetic portion 12.

The lateral sides 42 abut the lateral sides 42 of adjacent segments 14 in the initial position, and the lateral sides 42 are spaced from the lateral sides 42 of adjacent segments 14 along the axis A in the stretched position. In other words, the lateral sides 42 are spaced from each other along the axis A in the stretched position. This results in an increase in the length of the auxetic portion 12 along the axis.

The segments 14 may have any suitable shape. The segments 14 may be polygonal with one of the hinges 16 at each vertex. In the example shown in the figures, some segments 14 are quadrilateral and some segments 14 are triangular. The segments 14 are arranged in a repeating pattern. The pattern may repeat along the width W and along the axis A. The segments 14 may have any suitable shape, any suitable number of shapes, and any suitable pattern that results in the auxetic portion 12 widening and lengthening under the application of axial force that exceeds the predetermined level.

The hinges 16 rotatably connect the segments 14 together. In other words, the hinges 16 maintain connection between the segments 14 and allow at least some segments 14 to rotate relative to each other and at least some segments 14 to translate relative to each other. The hinges 16 and the segments 14 may be unitary, i.e., a single, uniform piece of material with no seams, joints, fasteners, or adhesives holding it together. When unitary, the hinges 16 and segments 14 are formed together simultaneously as a single continuous unit, e.g., by molding. In such an example, the hinges 16 may be referred to as living hinges. As described below the segments 14 and the hinges 16 may be formed by plastic injection molding. In examples in which the segments 14 and the hinges 16 are unitary, the segments 14 and the hinges 16 may be of the same material type. As an alternative to being unitary, the segments 14 and hinges 16 may be formed separately and the segments 14 subsequently assembled together.

The hinges 16 are spaced along the axis A. "Spaced along the axis" includes hinges 16 that are spaced from each other along a length of the axis A whether the hinges 16 are on the axis A or spaced from the axis A in the width W direction. The hinges 16 rotate about axes that are transverse to the axis A, as shown in FIGS. 4 and 6.

The strands 18 are each embedded in at least two of the hinges 16. In other words, the strands 18 are fixed to and at least partially surrounded by the material of the hinges 16. The strands 18 are positioned to allow limited rotation of the segments 14 from the initial position to the stretched position, and the strands 18 prevent further movement of the segments 14 beyond the stretched position.

The strands 18 are elongated. Some of the strands 18 are arranged as longitudinal strands 44 that are generally straightened along the axis from the initial position to the stretched position. Others of the strands 18 are arranged as lateral strands 46 that are generally straightened perpendicular to the axis, i.e., in the width direction, from the initial position to the stretched position.

Figure 3:
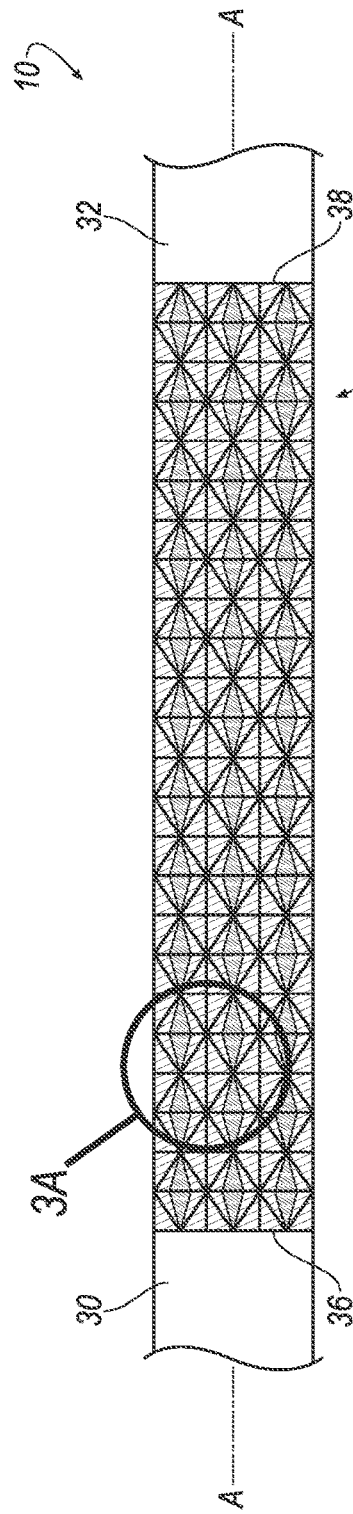
FIG. 3 is a front view of the seatbelt webbing with an example of the auxetic portion in an initial position.
Figure 4:
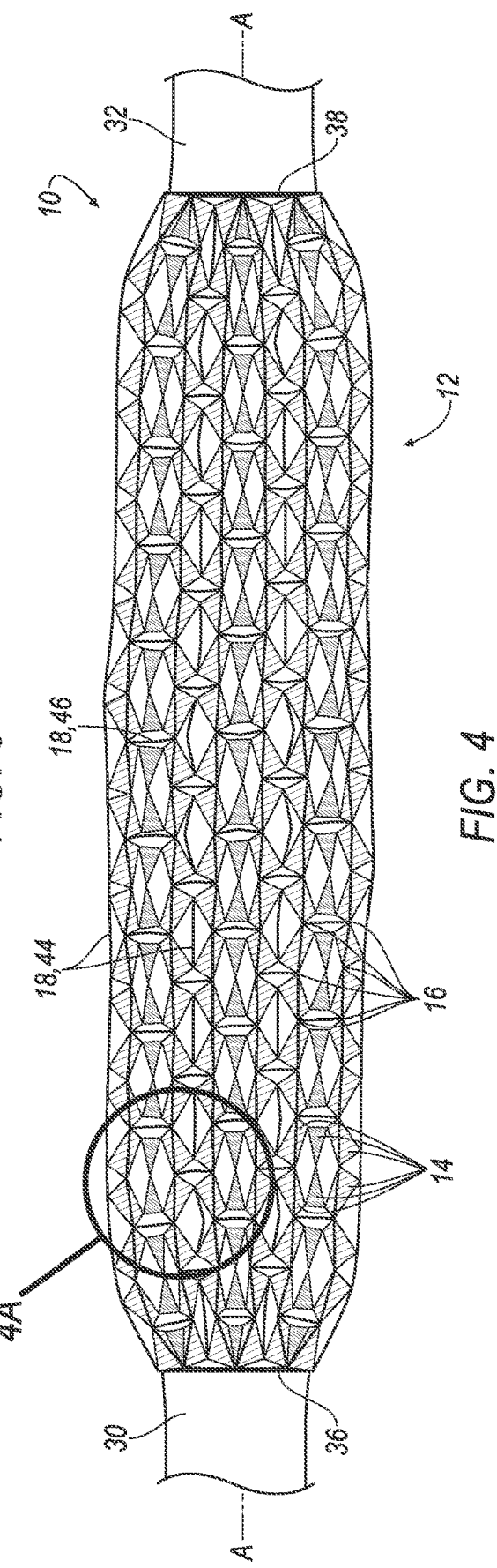
FIG. 4 is the view of FIG. 3 with the auxetic portion in a stretched position.
Figure 3A:
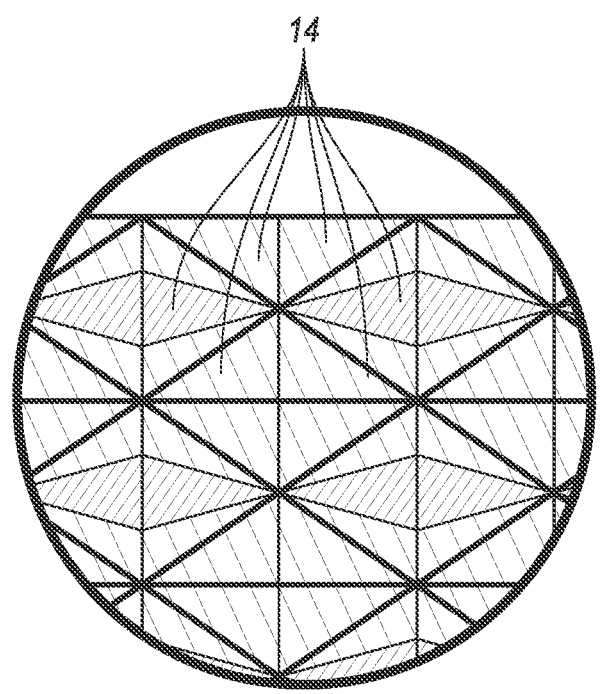
FIG. 3A is a magnified portion of FIG. 3.
Figure 4A:
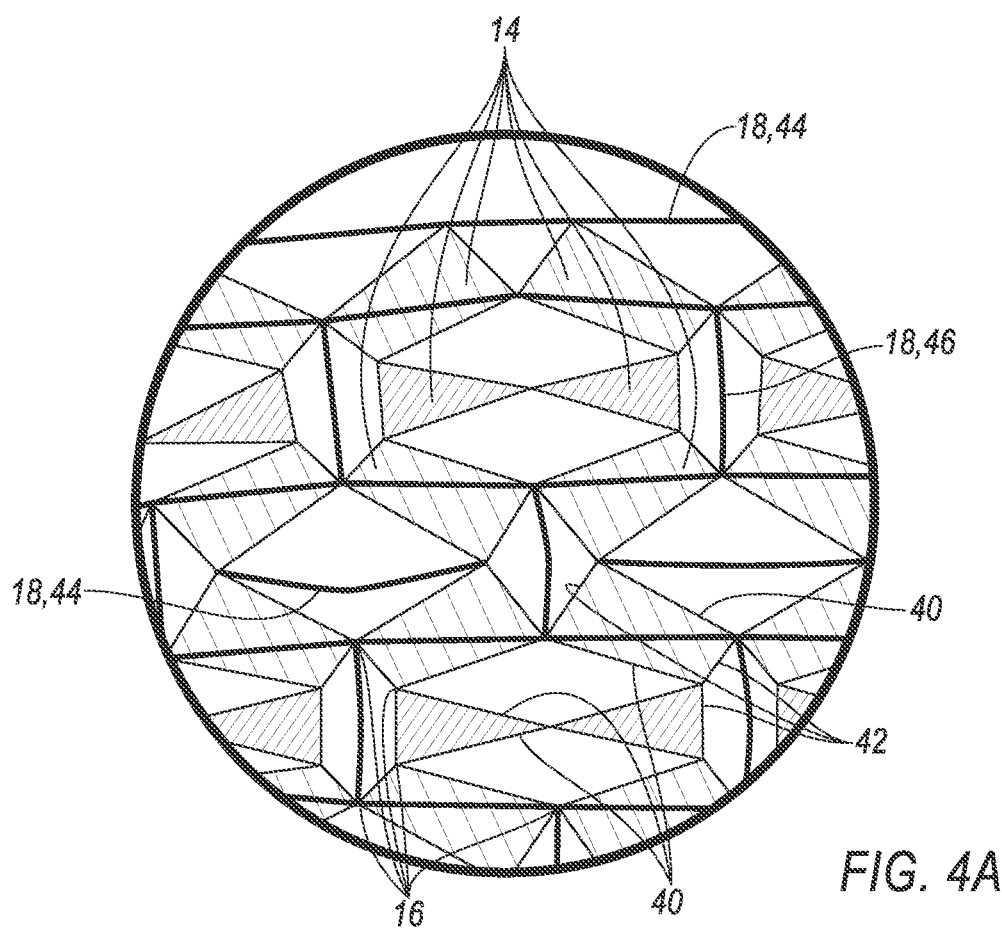
FIG. 4A is a magnified view of a portion of FIG. 4.
Figure 5A:
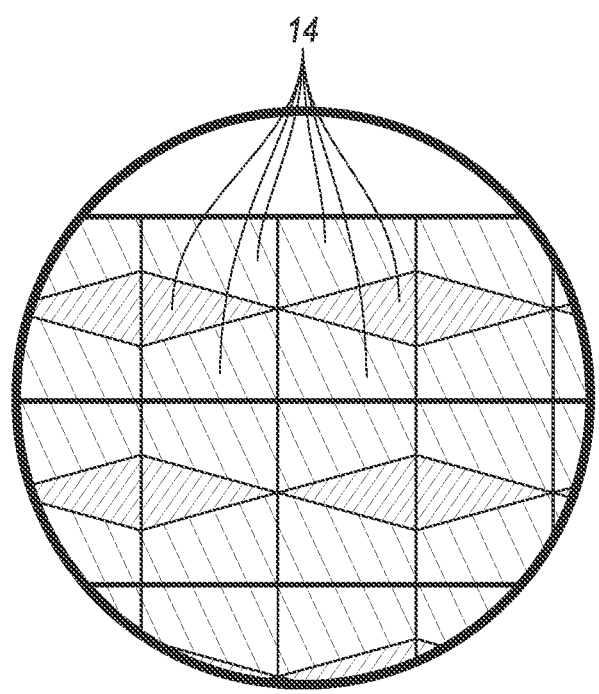
FIG. 5A is a magnified view of a portion of FIG. 5.
Figure 6A:
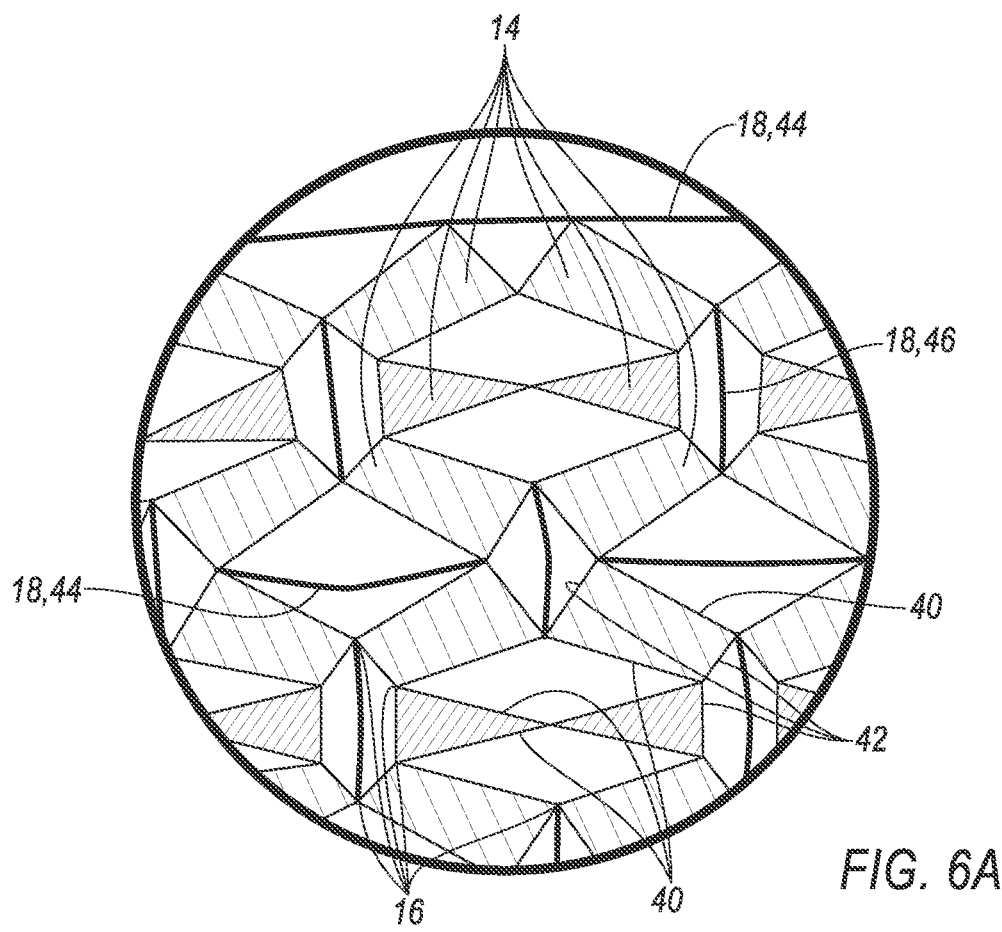
FIG. 6A is a magnified view of a portion of FIG. 6.

With reference to FIG. 3, at least some of the longitudinal strands 44 extend continuously from the first end 36 to the second end 38 of the auxetic portion 12. In such an example, the continuous, longitudinal strands 44 may be embedded in the segments 14 and may extend through the segment 14 from one hinge 16 to another hinge 16 on the segment 14. In the initial position, the continuous, longitudinal strands 44 may be positioned in a zigzag configuration. With reference to FIG. 4, when the auxetic portion 12 moves to the stretched position, the continuous, longitudinal strands 44 generally straighten along the axis as the segments 14 rotate about the hinges 16.

The strands 18 may include fibers. The fibers may be, for example, continuous carbon fibers. The strands 18 may include a polymer that encapsulates the fibers.

Figure 7:
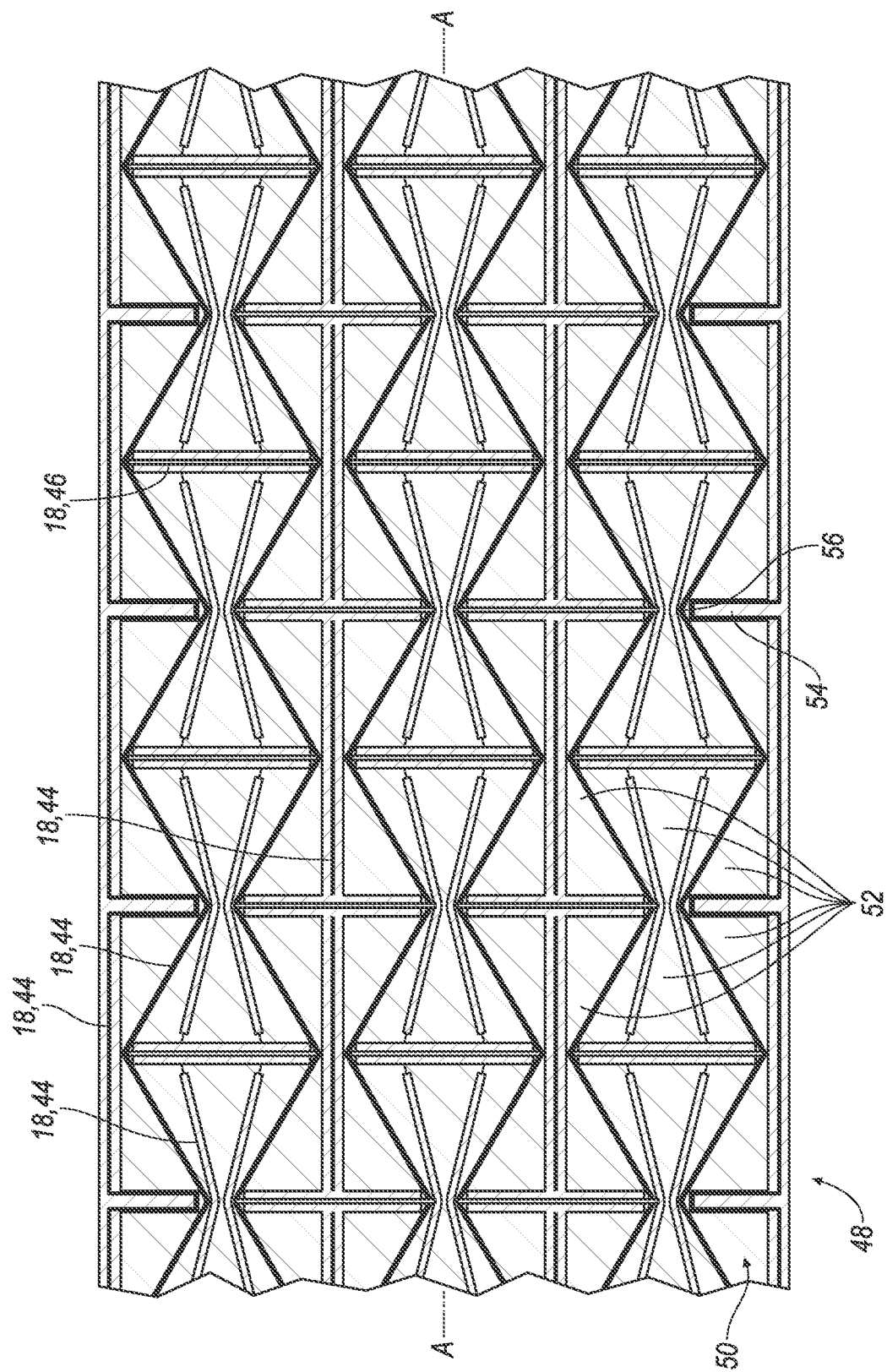
FIG. 7 is a cross-sectional view of a portion of a mold used to manufacture the auxetic portion and strands in the mold during injection of polymer into the mold.
Figure 8:
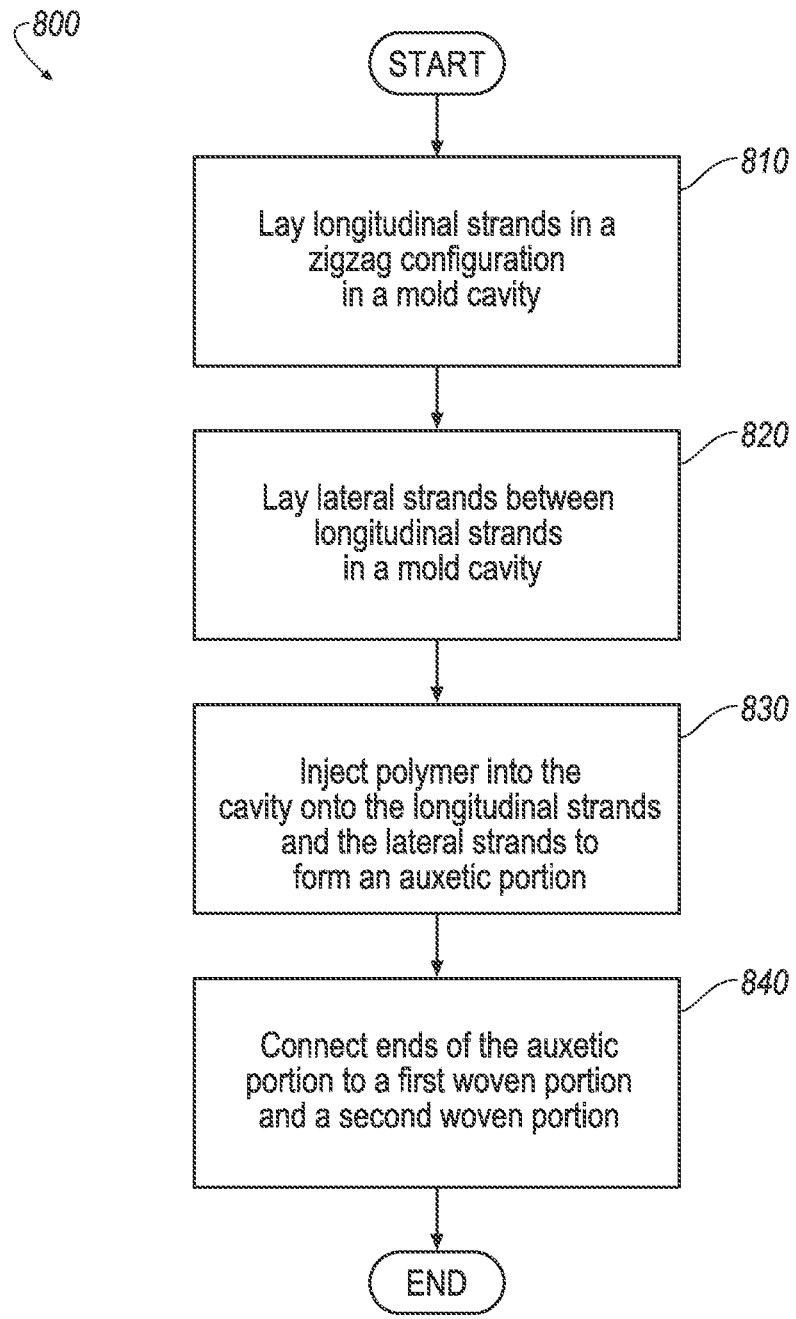
FIG. 8 is a flow chart showing the steps of a method of manufacturing the auxetic portion.

With reference to FIGS. 7 and 8, an example of a method of manufacturing the auxetic portion 12 is shown. FIG. 7 shows a mold 48 during a molding process. FIG. 8 shows the steps of forming the auxetic portion 12 in the mold 48.

The method includes providing the mold 48. As an example, the mold 48 may be any suitable type of plastic injection mold. The mold 48 has a cavity 50 elongated along an axis A. The axis A of the mold 48 corresponds to the axis A of the auxetic portion 12 after the auxetic portion 12 is formed in the mold 48 and before the auxetic portion 12 is removed from the mold 48. The cavity 50 has a plurality of segment cavities 52 spaced from each other along the axis A and transverse to the axis A by mold walls 54. The segment cavities 52 receive injection molded plastic that form the segments 14 of the auxetic portion 12. The mold 48 also has channels 56 through the mold walls 54 connecting the segment cavities 52. The channels 56 receive the injection molded plastic to form the hinges 16.

With reference to blocks 810 and 820, the method includes laying the strands 18 in the mold 48. Blocks 810 and 820 may be performed in either order or simultaneously. In block 810, the longitudinal strands 44 are laid in the mold 48. At least some of the longitudinal strands 44 are laid in the mold 48 in the zigzag configuration. Specifically, the longitudinal strands 44 in the zigzag configuration are laid across the segment cavities 52 and through the channels 56. Accordingly, during plastic injection in block 830 described below, the longitudinal strands 44 in the zigzag configuration are encapsulated by the material of the segments 14 and the material of the hinges 16.

With continued reference to block 810, in the example shown in FIG. 8, some of the longitudinal strands 44 are also laid in the mold 48 generally straight along the axis A. In block 820, the method includes laying lateral strands 46 in the mold 48. The lateral strands 46 may be straight, e.g., perpendicular to the axis A in the width W direction. Each of the straight longitudinal strands 44 and the straight lateral strands 46 are laid in at least two segment cavities 53. Accordingly, during plastic injection in block 830, the straight longitudinal strands 44 and the straight lateral strands 46 are embedded in the hinges 16. For both the straight longitudinal strands 44 and the straight lateral strands 46, at least a portion is laid on top of mold walls 54 to prevent encapsulation of that portion by plastic in block 830. In other words, the straight longitudinal strands 44 and the straight lateral strands 46 are free from communication with the segment cavities 52.

With reference to block 830, after laying the longitudinal strands 44 and the lateral strands 46, the method includes injecting polymer into the segment cavities 52 and channels 56. As an example, the polymer may be injected using any suitable plastic injection molding technique. The polymer is heated and/or pressurized to liquify the polymer and the liquified polymer is injected into the segment cavities 52 and channels 56. Upon cooling, the auxetic portion 12 is completed and may be removed from the mold 48.

With reference to block 840, the auxetic portion 12 is connected to the first woven portion 30 and the second woven portion 32. As described above, the auxetic portion 12 may be stitched, adhered, ultrasonically welded, etc., to the first woven portion 30 and the second woven portion 32.

In another example method of manufacturing the auxetic portion 12, the strands 18, i.e., the longitudinal strands 44 and the longitudinal strands 46, may be attached to a polymeric sheet that is subsequently cut into the plurality of segments 14 rotatably connected to each other at the hinges 16. The strands 18 may be attached to the polymeric sheet by laser welding, adhesive bonding, etc. The polymeric sheet is of the type of material described above for the segments 14.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt webbing comprising:
an auxetic portion elongated along an axis and having a plurality of segments rotatably connected to each other at hinges, the hinges being spaced along the axis and transverse to the axis; and
a plurality of strands, each strand embedded in at least two of the hinges.

2. The seatbelt webbing of claim 1, wherein the auxetic portion terminates at a first end on the axis and at a second end on the axis, and at least some of the strands extend from the first end to the second end.

3. The seatbelt webbing of claim 1, wherein the auxetic portion terminates at a first end on the axis and at a second end on the axis, and at least some of the strands extend from the first end to the second end in a zigzag configuration.

4. The seatbelt webbing of claim 1, wherein the auxetic portion is movable from an initial position to a stretched position, and the segments have sides, the sides abutting adjacent ones of the segments in the initial position, and the sides being spaced from the sides of adjacent ones of the segments in the stretched position.

5. The seatbelt webbing of claim 4, wherein the strands are in a zigzag orientation in the initial position and a substantially straight position along the axis in the stretched position.

6. The seatbelt webbing of claim 1, further comprising a woven portion fixed to the auxetic portion and extending from the auxetic portion along the axis.

7. The seatbelt webbing of claim 6, further comprising a second woven portion fixed to the auxetic portion, the auxetic portion extending along the axis from the woven portion to the second woven portion.

8. The seatbelt webbing of claim 1, wherein the hinges rotate transverse to axis.

9. The seatbelt webbing of claim 1, wherein the auxetic portion is movable from an initial position to a stretched position, and the segments are elongated along the axis and have longitudinal sides extending along the axis, the longitudinal sides abutting the longitudinal sides of adjacent ones of the segments in the initial position, and the longitudinal sides being spaced from the longitudinal sides of adjacent ones of the segments in a direction transverse to the axis in the stretched position.

10. The seatbelt webbing of claim 9, wherein the segments have lateral sides between the longitudinal sides, the lateral sides abutting the lateral sides of adjacent ones of the segments in the initial position, and the lateral sides being spaced from the lateral sides of adjacent ones of the segments along the axis in the stretched position.

11. The seatbelt webbing of claim 1, wherein the segments are in a repeating pattern.

12. The seatbelt webbing of claim 11, wherein the repeating pattern includes a repeated grouping of six segments.

13. The seatbelt webbing of claim 12, wherein two of the six segments have a first shape and four of the six segments have a second shape.

14. The seatbelt webbing of claim 1, wherein the segments are polymeric.

15. The seatbelt webbing of claim 14, wherein the polymer of the segments is a fiber-reinforced polymer.

* * * * *